(12) United States Patent
Strauss et al.

(10) Patent No.: US 10,646,829 B2
(45) Date of Patent: May 12, 2020

(54) HIGH FLUX, CHLORINE RESISTANT COATING FOR SULFATE REMOVAL MEMBRANES

(71) Applicant: Teledyne Scientific & Imaging, LLC, Thousand Oaks, CA (US)

(72) Inventors: Dennis R. Strauss, Ventura, CA (US); Rahul Ganguli, Agoura Hills, CA (US); Ten-Luen T. Liao, South Pasadena, CA (US); Vivek Mehrotra, Simi Valley, CA (US); Paulus Henricus Johannes Verbeek, Voorhout (NL); Thomas Krebs, Doorwerth (NL)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 232 days.

(21) Appl. No.: 15/630,792

(22) Filed: Jun. 22, 2017

(65) Prior Publication Data
US 2018/0369756 A1    Dec. 27, 2018

(51) Int. Cl.
*B01D 69/02*    (2006.01)
*B01D 61/02*    (2006.01)
(Continued)

(52) U.S. Cl.
CPC .............. *B01D 69/02* (2013.01); *B01D 65/08* (2013.01); *B01D 67/0088* (2013.01); *B01D 67/0093* (2013.01); *B01D 69/12* (2013.01); *B01D 71/56* (2013.01); *B01D 71/82* (2013.01); *C02F 1/442* (2013.01); *B01D 61/027* (2013.01); *B01D 2321/16* (2013.01); *B01D 2323/02* (2013.01); *B01D 2323/40* (2013.01); *B01D 2323/48* (2013.01); *B01D 2325/20* (2013.01); *B01D 2325/28* (2013.01); *B01D 2325/30* (2013.01); *B01D 2325/36* (2013.01); *C02F 2101/101* (2013.01); *C02F 2103/08* (2013.01); *C02F 2303/22* (2013.01)

(58) Field of Classification Search
CPC ........ B01D 69/02; B01D 69/12; B01D 71/56; B01D 71/82; B01D 65/08; B01D 67/0088; B01D 67/0093; B01D 61/027; B01D 2323/02; B01D 2323/40; B01D 2323/48; B01D 2325/20; B01D 2325/28; B01D 2325/30; B01D 2325/36; B01D 2321/16; C02F 1/442; C02F 2103/08; C02F 2101/101; C02F 2303/22
See application file for complete search history.

(56) References Cited

U.S. PATENT DOCUMENTS 4,421,660 A  * 12/1983  Sole ..................... B01J 13/12
                                                    252/62.54
4,830,885 A     5/1989  Tran et al.
(Continued)

*Primary Examiner* — John Kim
(74) *Attorney, Agent, or Firm* — M.J. Ram & Associates

(57) ABSTRACT

A filtration membrane coating comprising a hydrophilic polymer, a surfactant, and one or more charged compounds, each containing one or more sulfonate functionalities and one or more linkable functionalities selected from the group consisting of amine, monochlorotriazine, and dichlorotriazine. The hydrophilic polymer and surfactant form a thin primer layer which is also superhydrophilic. The primer layer improves flux, and enables improved adhesion of the one or more charged compounds, which form a charged dye layer on top of the primer layer when enhances rejection of charged divalent ions. The coating can be applied while the membrane is packaged in its final form, such as in a spiral wound or other configuration.

18 Claims, 2 Drawing Sheets

(51) Int. Cl.
  B01D 65/08 (2006.01)
  B01D 67/00 (2006.01)
  B01D 69/12 (2006.01)
  B01D 71/56 (2006.01)
  B01D 71/82 (2006.01)
  C02F 1/44 (2006.01)
  C02F 103/08 (2006.01)
  C02F 101/10 (2006.01)

(56) References Cited

U.S. PATENT DOCUMENTS

| | | |
|---|---|---|
| 5,767,189 A | 6/1998 | Palmer, Jr. |
| 6,026,968 A * | 2/2000 | Hachisuka ......... B01D 67/0088 210/490 |
| 7,867,417 B2 | 1/2011 | Mullette |
| 8,603,340 B2 | 12/2013 | Kurth et al. |
| 9,161,544 B2 | 10/2015 | Agrawal et al. |
| 9,254,465 B2 | 2/2016 | Kurth et al. |
| 2009/0143258 A1* | 6/2009 | Welton ................. C09K 8/528 507/221 |
| 2010/0051538 A1* | 3/2010 | Freeman ............ B01D 67/0093 210/500.33 |
| 2010/0133172 A1 | 6/2010 | Song et al. |
| 2012/0048805 A1* | 3/2012 | McCutcheon ..... B01D 67/0088 210/654 |
| 2012/0241371 A1* | 9/2012 | Revanur ............. B01D 53/228 210/488 |
| 2013/0334130 A1* | 12/2013 | Ganguli ................ B01D 65/08 210/500.29 |

\* cited by examiner

HIGH FLUX, CHLORINE RESISTANT COATING FOR SULFATE REMOVAL MEMBRANES

BACKGROUND OF THE INVENTION

Field of the Invention

This invention relates generally to filtration membranes, and more particularly to filtration membranes used for removing sulfate ions from seawater.

Description of the Related Art

Microfiltration (MF), ultrafiltration (UF), nanofiltration (NF), and reverse osmosis (RO) are pressure-driven separation processes used to remove a broad range of neutral or ionic molecules from fluids. Of these, nanofiltration membranes are used for removing sulfate ions from seawater prior to reservoir injection in the oil and gas industry. The NF membranes pass dissolved monovalent ions, while maintaining high rejection of dissolved divalent ions. By contrast, reverse osmosis membranes remove most dissolved ions (mono+divalent) and are used in desalination.

One of the first industrially utilized membranes capable of removing all dissolved ions from water was the cellulose acetate membrane developed by Loeb and Sourirajan (U.S. Pat. Nos. 3,133,132 and 3,133,137). While this membrane is still used, it is prone to hydrolysis in either very high or very low pH solutions. Since many cleaning solutions have either a high or a low pH, these membranes are no longer preferred.

An alternative method of forming membranes capable of rejecting dissolved salts is by interfacial polymerization. This technique can result in a very thin active polymer layer, ca. 200 nm thick, supported by a mechanically robust support layer. The thin active layer simultaneously provides high selectivity and high permeability. The interfacial polymerization is most commonly a polycondensation reaction between amines and either acid chlorides or isocyanates. Two of the most commercially successful membranes of this type use the reaction of trimesoyl acid chloride (TMC) with either piperazine or meta-phenylenediamine (MPD), as described by Cadotte (U.S. Pat. Nos. 4,259,183 and 4,277,344).

While the flux and rejection of piperazine-based nanofiltration membranes can vary depending on both polymerization conditions and post-treatment, a particularly useful property of these membranes is the ability to selectively remove some molecules while retaining others. For example, the dairy industry has used piperazine-based membranes to concentrate large neutral molecules (whey and lactose) while removing minerals such as calcium salts. In another application, which is of specific interest to this application, seawater is treated before injecting the permeate into oil reservoirs to displace oil and maintain pressure. In this membrane process, osmotic pressures are minimized by passing NaCl, while formation of barium sulfate within the reservoir is prevented by rejecting sulfate ions. This application has been described in U.S. Pat. No. 4,723,603.

However, known membranes exhibit some deficiencies, such as a low permeability and lack of resistance to chlorine in the feed water. The lower flux is a result of the tight pore size and polymeric nature of the active layer, which is somewhat hydrophobic. To counter the inherent hydrophobicity, post treatments such as polyvinyl alcohol coatings have been tried. If the coating is thin enough, it dissolves with time and the higher permeability is lost. If the coating is thick and more crosslinked, the resistance to permeability presented by the coating becomes an issue. The comparatively low flux results in the need for a large membrane surface area when designing treatment plants, resulting in high capital cost. With respect to chlorine resistance, U.S. Pat. No. 3,951,815, claims that the site of attack by chlorine on polyamide membranes is the amidic hydrogen atom present in the —CO—NH— group. As a result of this chlorine sensitivity, there are no membranes in the industry that allow the use of chlorine as a cleaning chemical for processes that include any polyamide/polypiperanzine based membranes. Given that chlorine is a widely used, highly effective cleaning agent and inexpensive biocide, this presents a significantly technical deficiency.

SUMMARY OF THE INVENTION

A coating is presented that, when applied to filtration membranes, increases the flux of the membranes and improves chlorine resistance. Increases of 30-50% in flux have been observed under identical conditions compared to industrially available membranes, and chlorine resistance values of >1200 ppm-hr with no changes in chloride rejection have been demonstrated.

The coating comprises a hydrophilic polymer, a surfactant, and one or more charged compounds, each containing one or more sulfonate functionalities and one or more linkable functionalities selected from the group consisting of amine, monochlorotriazine, and dichlorotriazine. The hydrophilic polymer and surfactant form a thin primer layer which is also superhydrophilic. The primer layer improves flux, and enables improved adhesion of the one or more charged compounds, which form a charged dye layer on top of the primer layer when enhances rejection of charged divalent ions.

One advantage of the present coating is that it can be applied while the membrane is packaged in its final form, such as in a spiral wound or other configuration. This enables a post treatment, which can be implemented onsite to treat existing membranes for retrofit purposes, and also reduces the complexity of the coating process, as the existing manufacturing processes need not be changed.

These and other features, aspects, and advantages of the present invention will become better understood with reference to the following drawings, description, and claims.

DETAILED DESCRIPTION OF THE INVENTION

Membranes to which the present coating has been applied are particularly well-suited for use as sulfate removal membranes (SRM), used to reduce the concentration of sulfate ions in seawater prior to injection to enhance recovery of oil in offshore oil production, and it is this application which is discussed in detail below. However, such membranes can be used in many other applications, such as demineralization of whey in the dairy industry. Other applications include desalting and dye removal from textile industry process water, brine recovery from industrial cleaning solutions, biological oxygen demand (BOD) and small organics removal from municipal waste water. Sulfate ions in seawater can cause scaling when the injected water meets the formation water containing calcium and barium ions, as the sulfate salts of these cations have very low solubility. In addition, the presence of sulfates in water also encourage the growth of sulfate reducing bacteria which can then cause souring of the well, due to the production of sulfides (such as hydrogen sulfide gas). Chemical inhibition of scaling is a viable technology to mitigate the effects of sulfate in seawater in offshore oil production. However, chemical inhibition is expensive and membrane-based sulfate removal is emerging to be a more cost-effective technology to deal with sulfate-related issues.

The principal membranes used for sulfate removal are nanofiltration membranes made using interfacial polymerization. The fabrication method employed to prepare these membranes is based on polycondensation of amines and either acid chlorides or isocyanates. FilmTec reverse osmosis (FT30) and sulfate removal (SR90) are prototypical membranes made by polycondensation of TMC with MPD and piperazine, respectively. The precursor to the SR90 membranes, FilmTec NF40 NF membranes, were prepared according to a process described in the literature, e.g. see J. E. Cadotte, R. S. King, R. J. Majerle, and R. J. Peterson, "Interfacial synthesis in the preparation of reverse osmosis membranes", J. Macromol. Sci.-Chem., A15 (5), p. 733. The SR90 is still made by similar processes, with additional proprietary chemicals added to the water and/or organic phase. In each case, more than 60% of incorporated amine in the polyamide is piperazine.

Figure 1:
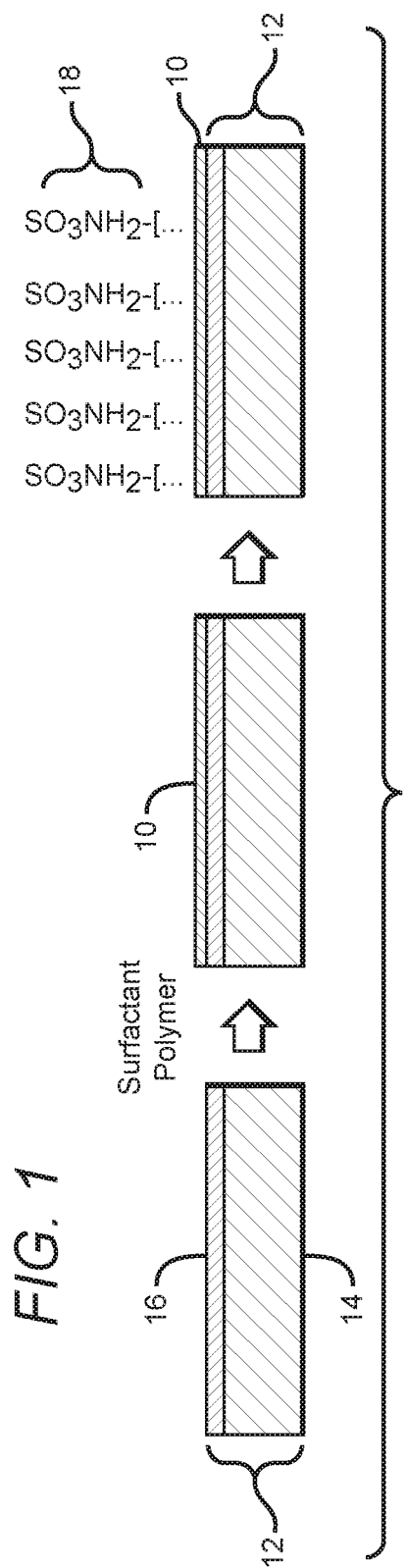
FIG. 1 is a diagram of a filtration membrane coating per the present invention.

Two important deficiencies of prior art membranes are low flux and lack of resistance to bleach—which is a common, inexpensive cleaning chemical and biocide. The present coating improves flux without compromising sulfate rejection, and simultaneously improves chlorine rejection. As shown in FIG. 1, the present coating is made in two basic steps. The first is to use a surfactant and hydrophilic polymer to form an ultrathin, defect-free base primer layer 10 on a membrane 12 (which typically consists of a support structure 14 and a thin polyamide membrane layer 16). Aspects of this surfactant/polymer layer have been disclosed in co-pending patent application Ser. No. 13/523,037. Primer layer 10 is ultrathin to present minimum transport resistance, and superhydrophilic to increase the flux of water through the membrane. Importantly, the layer is defect-free and highly adherent, resulting in a permanent coating with good protection to the underlying membrane.

Although flux is increased with the use of primer layer 10 alone, sulfate rejection typically suffers as the coating is not as highly charged. One or more charged compounds, each containing one or more sulfonate functionalities and one or more linkable functionalities selected from the group consisting of amine, monochlorotriazine, and dichlorotriazine, are used to form a sulfonate-containing dye 18, attached on top of the primer layer 10 to increase the charge density and recover the sulfate rejection properties of the membranes. It has been observed that membranes coated with the above-disclosed coating present significantly improved resistance to chlorine. Without being tied to the technical explanation, it is hypothesized that the improved chlorine resistance arises from the ability of the coating to (a) act as a sacrificial layer, i.e., consume the free chlorine through self oxidation while protecting the polyamide, and/or (b) reforming/healing broken bonds in the polyamide matrix due the chlorine oxidation.

The primer layer 10 preferably comprises greater than 10 wt % of surfactant, and has a thickness of less than or equal to 20 nm (preferably less than or equal to 5 nm). The hydrophilic polymer preferably comprises at least one material selected from the group consisting of polydopamine and its copolymers, poly (dopamine-acrylamide) and its copolymers, polyethylene, polyvinyl alcohol, hydroethyl cellulose, hydroxyl propyl cellulose, methyl cellulose poly (hydroxyethyl methacrylate) and its copolymers, styrene-maleic anhydride copolymer, methyl vinyl ether-maleic anhydride copolymer, polyethylenimine, carboxy methyl cellulose, locust bean gum, bean gum, carrageenan, agar, polyvinylpyrrolidone, sulfonate polysulfone, polyethylene oxide and copolymers, polyethylene glycol, polyacrylamide, and polysaccharide.

The surfactant in the primer layer preferably comprises at least one hydrocarbon chain having at least 16 carbon atoms, with 16 to 24 carbon atoms preferred. The surfactant can comprise, for example, N-erucyl-N,N-bis(2-hydroxyethyl)-N-methyl ammonium chloride, or one or more of sodium lauryl sulfate, sodium laureth sulfate, sodium lactate, tetrazolides, phospholipids capable of assuming a zwitterionic state, cocamidopropyl betaine, sulfobetaines, and polyethylene glycol.

The present coating can also include a second dye layer, which comprises a second charged compound containing one or more sulfonate functionalities and one or more linkable functionalities selected from the group consisting of amine, monochlorotriazine, and dichlorotriazine.

The coating can be applied to various types of membranes, including but not limited to nanofiltration membranes, tight ultrafiltration membranes, and reverse osmosis membranes. A preferred membrane is a polyamide-based nanofiltration membrane.

Figure 2:
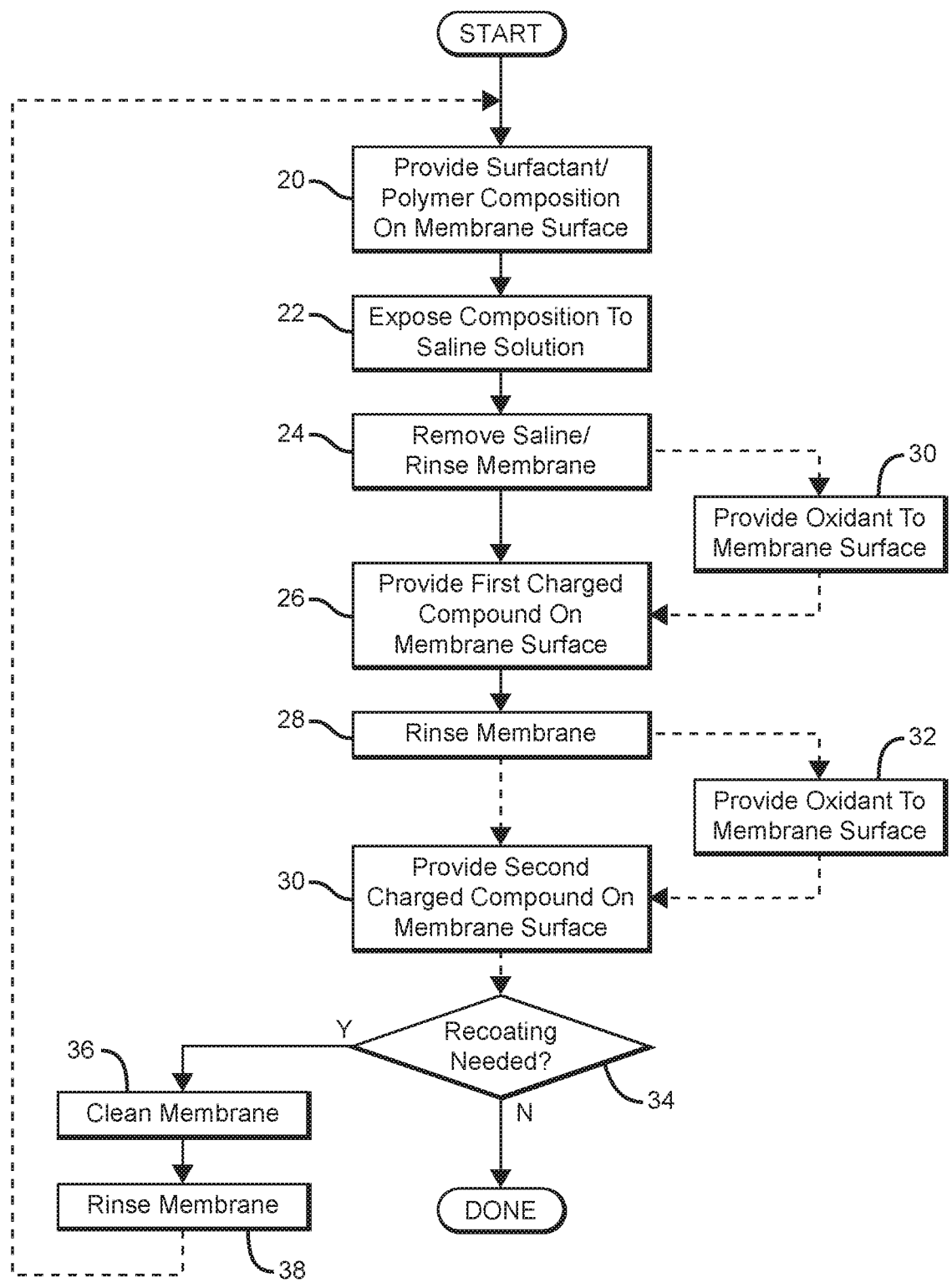
FIG. 2 is a flow diagram illustrate a method of fabricating a filtration membrane coating per the present invention.

A method of fabricating the present conformal chlorine-resistant, fouling resistant, and permeate flux-enhancing coating is now described, and illustrated in FIG. 2. In step 20, a composition is provided adjacent to a first surface of a membrane, wherein the composition comprises a hydrophilic polymer and a surfactant (the 'primer layer'). The composition is exposed to a saline solution in step 22. The saline solution is removed and the membrane rinsed in step 24.

A first charged compound is provided adjacent to the first surface of the membrane (step 26), wherein the first charged compound contains one or more sulfonate functionalities and one or more linkable functionalities selected from the group consisting of amine, monochlorotriazine, and dichlorotriazine (the 'first dye layer'). The first charged compound is preferably dissolved in a buffered solution adjusted to a pH between 7 and 11. The membrane is then rinsed (step 28).

An oxidant may optionally be provided adjacent the first surface of the membrane (step 30) prior to providing the first charged compound (step 26). The oxidant is preferably dissolved in a buffered solution adjusted to a pH between 5 and 11.

The method may further comprise providing a second charged compound adjacent to the first surface of the membrane (step 30), wherein the second charged compound contains one or more sulfonate functionalities and one or more linkable functionalities selected from the group consisting of amine, monochlorotriazine, and dichlorotriazine (the 'second dye layer'). As with the first dye layer, the second dye layer is preferably dissolved in a buffered solution adjusted to a pH between 7 and 11. An oxidant may optionally be provided adjacent the first surface of the membrane (step 32) prior to providing the second charged compound (step 30). As before, the oxidant is preferably dissolved in a buffered solution adjusted to a pH between 5 and 11.

A membrane so coated may be cleaned using warm water. The membrane may be prepackaged, with the present coating applied to the prepackaged membrane. For example, the prepackaged membrane can be in a spiral-wound, flat sheet or hollow fiber configuration when the present coating is applied.

If needed (step 34), a coated membrane may be recoated. To recoat the membrane, it is first cleaned using cleaning chemicals which includes oxidants such as bleach (step 36), then rinsed with water (step 38). The coating process is then performed again from step 20.

The inventive steps are further described in the following examples.

EXAMPLES

Polyamide-based nanofiltration (NF) membrane coupons were tested in crossflow at 250 psi applied pressure with a 40 gm/L Instant Ocean simulated seawater feed solution. Permeate flux and chloride and sulfate rejections were measured after flux stabilized. Since there is a wide variability in the flux and rejection from one coupon to the next, the same membrane coupons were then coated per the protocols detailed next. The coating process is described in three separate steps: (a) Primer layer, (b) Dye 1 layer, and (c) Dye 2 layer. The surfactant mixture referred to in all examples is 40% sodium lauryl ether sulfate in water.

Example 1

After measurement of flux and rejection, an uncoated membrane coupon is rinsed with DI water and partially dried at room temperature. Separately, a buffer solution is prepared by dissolving 0.52% tris(hydroxymethyl) aminomethane (Tris) in water and adjusting to pH8 with dilute HCl. 0.424 gm of dopamineHCl is dissolved in 25.0 gm Tris buffer solution and immediately added to 26.2 gm of surfactant mixture. The mixture is stirred vigorously for about 1 minute until a homogeneous viscous mixture is formed. The liquid is poured onto the partially dried membrane coupon and allowed to spread to form a thin layer. After sitting for 1 hour, the coated membrane coupon is immersed in a 32 gm/L aqueous NaCl solution overnight. The coupon is removed from the brown liquid and rinsed with DI water to remove excess coating. This concludes step (a), and results in a membrane with a thin, hydrophilic primer layer.

The coupon is next immersed in a solution of 62 ppm NaOCl in pH10 NaHCO$_3$/Na2CO3 buffer solution for 20 hours to give a NaOCl exposure of 1240 ppm-hr. The coupon is then rinsed and immersed in a solution of 0.1% benzopurpurin 4B (BP4B) in pH10 NaHCO$_3$/Na2CO3 buffer solution for 20 hours. The coupon is rinsed and soaked in DI water until excess BP4B stops leaching out of the coupon. This concludes step (b), dye 1 layer, where one layer of highly charged dye is emplaced on the membrane to improve sulfate rejection.

The coupon is then immersed in a solution of 200 ppm NaOCl in pH10 NaHCO$_3$/Na2CO3 buffer for 20 hours to give an additional NaOCl exposure of 4000 ppm-hr. The coupon is then rinsed and immersed in a solution of 0.4% 4-amino-5-hydroxynaphthalene-2,7-disulfonic acid Na salt hydrate (H-Acid Na salt) in pH10 NaHCO$_3$/Na2CO3 buffer solution for 16-24 hours. The coupon is then rinsed and soaked in DI water to remove excess H-Acid Na salt. This concludes step (c), dye layer 2, and the full coating of the membrane is complete.

Table 1 shows the performance of an uncoated membrane and the performance of the same membrane after coating. The coated membrane shows about 50% higher flux with similar sulfate resection.

TABLE 1

| Membrane | Flux (Gph/m2) | Sulfate in feed (ppm) | Sulfate in product (ppm) | Chloride in feed (ppm) | Chloride in product (ppm) | Ratio of sulfate to chloride rejection |
|---|---|---|---|---|---|---|
| Uncoated | 7.6 | 2800 | 31 | 19087 | 16459 | 7.2 |
| Coated | 11.3 | 2800 | 40 | 18866 | 16856 | 9.2 |

Counter Example 1

After measurement of the flux and rejection, an uncoated membrane coupon is rinsed with DI water and partially dried at room temperature. Separately a buffer solution is prepared by dissolving 0.52% tris(hydroxymethyl) aminomethane (Tris) in water and adjusting to pH8 with dilute HCl. To the buffer solution, 25.0 gm of Tris buffer solution is added to 26.2 gm of surfactant mixture. The mixture is stirred vigorously for about 1 minute, until a homogeneous viscous mixture is formed. The liquid is poured onto the partially dried membrane coupon and allowed to spread to form a thin layer. After sitting for 1 hour, the coated membrane coupon is immersed in a 32 gm/L aqueous NaCl solution overnight. The coupon is removed from the liquid and rinsed with DI water to remove excess coating.

The coupon is next immersed in a solution of 62 ppm NaOCl in pH10 NaHCO$_3$/Na2CO3 buffer solution for 20 hours to give a NaOCl exposure of 1240 ppm-hr. The coupon is then rinsed and immersed in a solution of 0.1% benzopurpurin 4B (BP4B) in pH10 NaHCO$_3$/Na2CO3 buffer solution for 20 hours. The coupon is rinsed and soaked in DI water until excess BP4B stops leaching out of the coupon.

The coupon is then immersed in a solution of 200 ppm NaOCl in pH10 NaHCO$_3$/Na2CO3 buffer for 20 hours to give an additional NaOCl exposure of 4000 ppm-hr. The coupon is then rinsed and immersed in a solution of 0.4% 4-amino-5-hydroxynaphthalene-2,7-disulfonic acid Na salt hydrate (H-Acid Na salt) in pH10 NaHCO$_3$/Na2CO3 buffer solution for 16-24 hours.

The coupon is then rinsed and soaked in DI water to remove excess H-Acid Na salt. Table 2 shows the performance of the uncoated and coated membranes.

TABLE 2

| Membrane | Flux (Gph/m2) | Sulfate in feed (ppm) | Sulfate in product (ppm) | Chloride in feed (ppm) | Chloride in product (ppm) | Ratio of sulfate to chloride rejection |
|---|---|---|---|---|---|---|
| Uncoated | 8.3 | 2650 | 26 | 21061 | 17074 | 5.2 |
| Coated | 8.8 | 2670 | 31 | 20939 | 16885 | 5.1 |

There was no substantial difference in flux or rejection of sulfate or chloride between the coated and uncoated membranes when dopamine monomer was not included in the primer layer.

Counter Example 2

After measurement of the flux and sulfate rejection, an uncoated membrane coupon is rinsed with DI water and partially dried at room temperature. Separately a buffer solution is prepared by dissolving 0.52% tris(hydroxymethyl) aminomethane (Tris) in water and adjusting to pH8 with dilute HCl. 0.424 gm of dopamineHCl is dissolved in 25.0 gm Tris buffer solution and immediately added to 26.2 gm of surfactant mixture. The mixture is stirred vigorously for about 1 minute, until a homogeneous viscous mixture is formed. The liquid is poured onto the partially dried membrane coupon and allowed to spread to form a thin layer. After sitting for 1 hour, the coated membrane coupon is immersed in a 32 gm/L aqueous NaCl solution overnight.

The coupon is removed from the brown liquid and rinsed with DI water to remove excess coating. Table 3 shows the performance of an uncoated membrane and the performance of the same membrane after coating.

TABLE 3

| Membrane | Flux (Gph/m2) | Sulfate in feed (ppm) | Sulfate in product (ppm) | Chloride in feed (ppm) | Chloride in product (ppm) | Ratio of sulfate to chloride rejection |
|---|---|---|---|---|---|---|
| Uncoated | 9.2 | 2978 | 24 | 18240 | 16070 | 8.34 |
| Coated | 11.8 | 2859 | 23 | 18603 | 16843 | 10.48 |

The coated membrane shows about 28% increase in flux with no increase in sulfate rejection, showing that the application of only the primer layer increases flux, but not to the extent achieved by the addition of subsequent layers of dye.

Counter Example 3

After measurement of the flux and rejection, an uncoated membrane coupon is rinsed with DI water and partially dried at room temperature. The coupon is immersed in a solution of 0.3% benzopurpurin-4B at room temperature for 70 hours, then rinsed with DI water and soaked in 2 g/L NaCl overnight, then re-tested. Table 4 shows the performance of an uncoated membrane and the performance of the same membrane after coating.

TABLE 4

| Membrane | Flux (Gph/m2) | Sulfate in feed (ppm) | Sulfate in product (ppm) | Chloride in feed (ppm) | Chloride in product (ppm) | Ratio of sulfate to chloride rejection |
|---|---|---|---|---|---|---|
| Uncoated | 14.6 | 2628 | 54 | 19503 | 17247 | 8.47 |
| Coated | 9.55 | 2629 | 71 | 19046 | 17788 | 14.72 |

A large reduction in flux accompanied by reduction in sulfate reduction is seen when the membranes are modified only with the dye and nothing else.

Example 2

Figure 3:
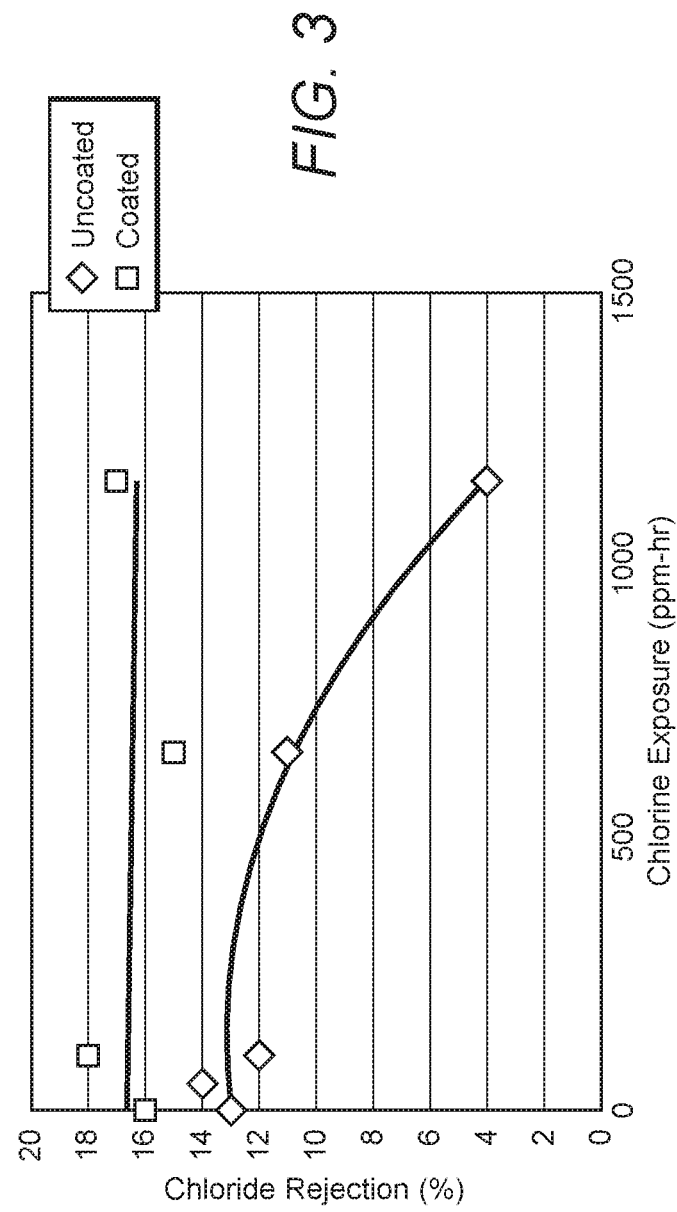
FIG. 3 is a graph illustrated chlorine rejection vs. chlorine exposure for an uncoated membrane and for a membrane coated per the present invention.

A membrane coupon as coated in Example 1, and an uncoated membrane coupon were both exposed to a solution of sodium hypochlorite (household bleach) for extended periods of time. The bleach containing solution was permeated through the membrane during the exposure period. Chloride rejection was measured for both membranes during various times and used to understand the effect of bleach on membrane properties. Typically, the chloride rejection of a membrane suffers (becomes lower) due to exposure to chlorine. The chloride rejection vs. the exposure as measured in ppm-hrs is shown in FIG. 3. The uncoated membrane shows large reduction in chloride rejection at 1150 ppm-hrs of exposure, whereas the chloride exposure of the coated membrane does not change.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of fabricating a conformal chlorine-resistant, fouling resistant, and permeate flux-enhancing coating for use on a membrane, the method comprising:
   providing a composition adjacent to a first surface of a membrane, wherein the composition comprises a hydrophilic polymer and a surfactant, said hydrophilic polymer and said surfactant forming a primer layer on said first surface of said membrane;
   wherein said hydrophilic polymer comprises at least one material selected from the group consisting of polydopamine and its copolymers, poly (dopamine-acrylamide) and its copolymers, polyethylene, polyvinyl alcohol, hydroethyl cellulose, hydroxyl propyl cellulose, methyl cellulose poly (hydroxyethyl methacrylate) and its copolymers, styrene-maleic anhydride copolymer, methyl vinyl ether-maleic anhydride copolymer, polyethylenimine, carboxy methyl cellulose, locust bean gum, bean gum, carrageenan, agar, polyvinylpyrrolidone, sulfonate polysulfone, polyethylene oxide and copolymers, polyethylene glycol, polyacrylamide, and polysaccharide, and
   wherein said surfactant comprises one or more of sodium lauryl sulfate, sodium laureth sulfate, sodium lactate, tetrazolides, phospholipids capable of assuming a zwitterionic state, cocamidopropyl betaine, sulfobetaines, polyethylene glycol;
   exposing the composition to a saline solution;
   removing the saline solution;
   rinsing the membrane;
   providing a first charged compound adjacent to said primer layer on said first surface of said membrane, wherein said first charged compound contains one or more sulfonate functionalities and one or more linkable functionalities selected from the group consisting of amine, monochlorotriazine, and dichlorotriazine; and
   rinsing the membrane.

2. The method of claim 1, further comprising providing an oxidant adjacent to said first surface of said membrane prior to providing said first charged compound.

3. The method of claim 2, wherein said oxidant is dissolved in a buffered solution adjusted to a pH between 5 and 11.

4. The method of claim 1, wherein said first charged compound is dissolved in a buffered solution adjusted to a pH between 7 and 11.

5. The method of claim 1, further comprising providing a membrane having said first surface and a second surface.

6. The method of claim 1, further comprising rinsing the first surface of said membrane after removing said saline solution.

7. The method of claim 1, further comprising providing a second charged compound adjacent to said first surface of said membrane, wherein said second charged compound contains one or more sulfonate functionalities and one or more linkable functionalities selected from the group consisting of amine, monochlorotriazine, and dichlorotriazine, wherein said second charged compound is dissolved in a buffered solution adjusted to a pH between 7 and 11.

8. The method of claim 7, further comprising providing an oxidant adjacent to said first surface of said membrane prior to providing said second charged compound.

9. The method of claim 1, further comprising cleaning said coated membrane using warm water.

10. The method of claim 1, wherein said membrane is prepackaged, and said coating is applied to said prepackaged membrane.

11. The method of claim 10, wherein said prepackaged membrane is in a spiral-wound, flat sheet or hollow fiber configuration.

12. The method of claim 1, further comprising recoating said membrane in the field, said recoating comprising:
cleaning said membrane using cleaning chemicals which includes oxidants such as bleach;
rinsing said membrane with water; and
repeating the coating process in accordance with claim 1.

13. A method for inhibiting aquatic fouling and increasing chlorine resistance for a membrane, the method comprising:
providing a membrane suitable for use in aquatic media;
coating a first surface of the membrane with a conformal coating comprising:
a hydrophilic polymer;
a surfactant, said hydrophilic polymer and said surfactant forming a primer layer on said first surface of said membrane;
a first charged compound adjacent to said primer layer on said first surface of said membrane, said first charged compound containing one or more sulfonate functionalities and one or more linkable functionalities selected from the group consisting of amine, monochlorotriazine, and dichlorotriazine;
wherein said hydrophilic polymer comprises at least one material selected from the group consisting of polydopamine and its copolymers, poly (dopamine-acrylamide) and its copolymers, polyethylene, polyvinyl alcohol, hydroethyl cellulose, hydroxyl propyl cellulose, methyl cellulose poly (hydroxyethyl methacrylate) and its copolymers, styrene-maleic anhydride copolymer, methyl vinyl ether-maleic anhydride copolymer, polyethylenimine, carboxy methyl cellulose, locust bean gum, bean gum, carrageenan, agar, polyvinylpyrrolidone, sulfonate polysulfone, polyethylene oxide and copolymers, polyethylene glycol, polyacrylamide, and polysaccharide, and
wherein said surfactant comprises one or more of sodium lauryl sulfate, sodium laureth sulfate, sodium lactate, tetrazolides, phospholipids capable of assuming a zwitterionic state, cocamidopropyl betaine, sulfobetaines, polyethylene glycol.

14. The method of claim 13, wherein said coating further comprises a second charged compound, containing one or more sulfonate functionalities and one or more linkable functionalities selected from the group consisting of amine, monochlorotriazine, and dichlorotriazine.

15. The method of claim 13, wherein said membrane is prepackaged, and said coating is applied to said prepackaged membrane.

16. The method of claim 15, wherein said prepackaged membrane is in a spiral-wound, flat sheet or hollow fiber configuration.

17. The method of claim 13, further comprising cleaning said coated membrane using warm water.

18. The method of claim 13, further comprising recoating said membrane in the field, said recoating comprising:
cleaning said membrane using cleaning chemicals which includes oxidants such as bleach;
rinsing said membrane with water; and
repeating the coating process in accordance with claim 13.

* * * * *